United States Patent [19]

Siegle et al.

[11] 3,929,838
[45] Dec. 30, 1975

[54] N-METHYL-N-(3-TRIFLUOROMETHYLPHENYLMERCAPTO)-CARBAMIC ACID DIHYDROBENZOFURANYL ESTERS

[75] Inventors: Peter Siegle, Cologne; Engelbert Kühle, Berg. Gladbach; Wolfgang Behrenz; Ingeborg Hammann, both of Cologne, all of Germany

[73] Assignee: Bayer Aktiengesellschaft, Leverkusen, Germany

[22] Filed: May 15, 1973

[21] Appl. No.: 360,485

[30] Foreign Application Priority Data

May 27, 1972 Germany............................ 2225872
Sept. 15, 1972 Germany............................ 2245344

[52] U.S. Cl........ 260/346.2 R; 260/470; 260/340.9; 424/278; 424/285; 424/300
[51] Int. Cl.².............................. C07D 307/79
[58] Field of Search .................... 260/346.2 R

[56] References Cited
UNITED STATES PATENTS 3,663,594  5/1972  Brown et al. ................. 260/470
3,723,472  3/1973  Start et al. .................... 260/346.2 R

FOREIGN PATENTS OR APPLICATIONS 710,959  2/1971  South Africa

OTHER PUBLICATIONS

Zumach et al., Chem. Abstracts, Vol. 77, (1972), 43215F, Abstract of Ger. Offen. 2,045,441, Mar. 23, 1972.

Yale, Journal of Medicinal and Pharmaceutical Chem., Vol. 1, No. 2, (1959), pp. 121-123 and 131.

*Primary Examiner*—Henry R. Jiles
*Assistant Examiner*—Bernard I. Dentz
*Attorney, Agent, or Firm*—Burgess, Dinklage & Sprung

[57]      ABSTRACT

N-methyl-N-(3-trifluoromethylphenylmercapto)-carbamic acid phenyl esters of the general formula

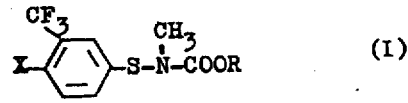

in which
  X is hydrogen or halogen, and
  R is phenyl, naphthyl or dihydrobenzofuranyl optionally substituted by alkyl, alkenyl, alkoxy, alkenoxy, alkylmercapto or dioxolanyl, which possess insecticidal, acaricidal, nematocidal and fungicidal properties.

3 Claims, No Drawings

N-METHYL-N-(3-TRIFLUOROMETHYLPHENYL-MERCAPTO)-CARBAMIC ACID DIHYDROBENZOFURANYL ESTERS

The present invention relates to and has for its objects the provision of particular new N-methyl-N-(3-trifluoromethylphenylmercapto)-carbamic acid phenyl esters which possess insecticidal, acaricidal, nematocidal and fungicidal properties, active compositions in the form of mixtures of such compounds with solid and liquid dispersible carrier vehicles, and methods for producing such compounds and for using such compounds in a new way especially for combating pests, e.g. insects, acarids, nematodes and fungi, with other and further objects becoming apparent from a study of the within specification and accompanying examples.

It has been disclosed that trihalogenomethyl-sulfenylated N-methylcarbamic acid aryl esters are very good insecticides and surpass the unsubstituted carbamates in their better insecticidal activity and their lower toxicity towards warmblooded animals (DOS 1,922,929). Admittedly, it is a disadvantage that members of this series frequently show a certain irritant action to the skin, which prevents their technical utilization in numerous fields.

It has also been disclosed that certain N-substituted arylcarbamates possess insecticidal properties (see DOS 1,949,234). However, the disadvantage of these compounds is their low activity, especially if low concentrations are used.

The present invention provides, as new compounds, the N-sulfenylated N-methylcarbamic acid aryl esters of the general formula

  (I)

in which
X is hydrogen or halogen, and
R is phenyl, naphthyl or dihydrobenzofuranyl optionally substituted by alkyl, alkenyl, alkoxy, alkenoxy, alkylmercapto or dioxolanyl.

Preferably X is hydrogen and R is phenyl optionally substituted by lower alkyl, lower alkenyl, lower alkoxy, lower alkenoxy, lower alkylmercapto or dioxolanyl, especially 3,5-dimethyl-4-methylmercaptophenyl, phenyl substituted in the 2-position by $C_1$–$C_3$ alkoxy, by dioxolanyl or by $C_2$–$C_3$ alkenoxy, naphthyl or 2,2-dimethyl-2,3-dihydrobenzofuranyl; or X is halogen, especially chlorine, and R is phenyl, naphthyl or dihydrobenzofuranyl optionally substituted by alkyl, alkenyl, alkoxy, alkenoxy, alkylmercapto or dioxolanyl.

It is distinctly surprising that the compounds according to the present invention display a higher insecticidal, acaricidal and nematocidal activity than the corresponding non-sulphenylated carbamates. Furthermore, these substituted compounds are far less toxic towards warm-blooded animals. Additionally, the compounds according to the invention are better tolerated by the skin than the known trihalogenomethylsulfenylated carbamic acid esters. The compounds according to the invention thus represent an enrichment of the art.

The present invention also provides a process for the production of an N-sulfenylated N-methylcarbamic acid aryl ester of the formula (I) in which a substituted carbamic acid fluoride of the general formula

  (II)

in which
X has the above-mentioned meaning, is reacted with a compound of the general formula

R — OH  (III), in which
R has the above-mentioned meaning, in the presence of a diluent, the compound (III) being reacted as such in the presence of an acid-binding agent, or in the form of an alkali metal salt thereof.

When using N-methyl-N-(3-trifluoromethylphenylmercapto)-carbamic acid fluoride and 2-isopropoxyphenol as starting materials, the course of the reaction can be represented by the following equation:

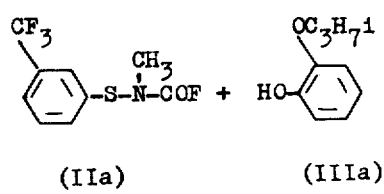

(IIa)          (IIIa)

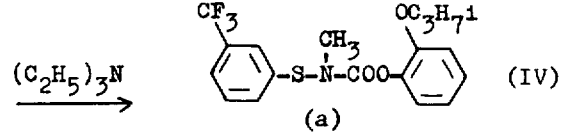  (IV)

(a)

The substituted carbamic acid fluorides required for this process can be produced according to a known process (see German Auslegeschrift No. 1,297,095), for example as follows:

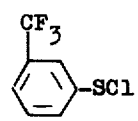

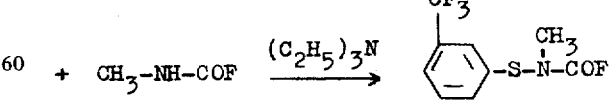

The sulfenic acid chlorides which herein serve as starting materials are known (see DOS 2,049,814).

Specific examples of preferred N-methylcarbamic acid esters of the formula (I) are: N-Methyl-N-(3-trifluoromethylphenylmercapto)-carbamic acid 2-isopropoxyphenyl ester, 3,5-dimethyl-4-methylmercaptophenyl ester, 2-dioxolanylphenyl ester, 1-naphthyl ester and 7-(2,2-dimethyl-2,3-dihydrobenzofuranyl) ester and N-methyl-N-(4-chloro-3-trifluoromethylphenylmercapto)-carbamic acid phenyl ester, 2-isopropoxyphenyl ester, 3,5-dimethyl-4-methylmercaptophenyl ester, 2-dioxolanylphenyl ester, 4-tolyl ester, 2-methoxy-4-methylphenyl ester, 2-alkoxyphenyl esters, 2-methoxyphenyl esters, 2-isopropylphenyl ester, 3-isopropylphenyl ester, 3-tert.-butylphenyl ester, 1-naphthyl ester, 7-(2,2-dimethyl-2,3-dihydrobenzofuranyl) ester and 2-isopropylmercaptophenyl ester.

Possible diluents are all inert organic solvents, especially ethers, such as diethyl ether, dioxane and tetrahydrofuran, hydrocarbons, such as benzene, and chlorinated hydrocarbons, such as chloroform and chlorobenzene.

To bind the hydrogen fluoride liberated in the reaction a tertiary base, such as triethylamine, is generally added to the reaction mixture, but it is optionally also possible to start directly from an alkali metal salt of the compound ROH.

The reaction temperatures can be varied over a fairly wide range, but are in general from 0° to 100°C, preferably from 20° to 40°C.

In carrying out the process according to the invention, equimolar amounts of the reactants are generally used. In many cases, however, it has proved advantageous to use the compounds of the formula ROH in slight excess, preferably up to 20%.

As has already been mentioned, the new N-sulfenylated N-methylcarbamic acid aryl esters are distinguished by an excellent insecticidal and acaricidal activity against plant pests and pests harmful to health. Herein, they possess a good action against both sucking and biting insects and against mites. At the same time they possess a low phytotoxicity; the compounds according to the invention are also in part effective against phytopathogenic fungi and resistant aphids. Furthermore they possess a good action against nematodes and soil-insects.

To the sucking insects there belong, in the main, aphids (Aphididae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and the larvae of the cockchafer (*Melolontha melolontha*); cockroaches, such as the German cockroach (*Blattella germanica*), American cockroach (*Periplaneta americana*), Madeira cockroach (Leucophaea or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acarina) there are classed, in particular, the spider mites (Tetranychidae) such as the two-spotted spider mite (*Tetranychus urticae*) and the European red mite (*Paratetranychus pilosus* = *Panonychus ulmi*), gall mites, for example the blackcurrant gall mite (*Eriophyes ribis*) and tarsonemids, for example the broad mite (*Hermitarsonemus latus*) and the cyclamen mite (*Tarsonemus pallidus*); finally, ticks, such as the relapsing fever tick (*Ornithodorus moubata*).

When applied against pests harmful to health and pests of stored products, particularly flies and mosquitoes, the present compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, nematocides and fungicides, or bactericides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, nematodes and fungi, and more particularly methods of combating at least one of insects, acarids and nematodes, which comprises applying to at least one of correspondingly (a) such insects, (b) such acarids, (c) such nematodes, (d) such fungi, and (e) the corresponding habitat thereof, i.e. the locus to be protected, a correspondingly combative or toxic amount, i.e. an insecticidally, acaricidally, nematocidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Residual test

Test insects: *Musca domestica* and *Aedes aegypti*
Wettable powder base consisting of:
3% sodium diisobutylnaphthalene-1-sulphonate
6% sulphite waste liquor, partially condensed with aniline
40% highly dispersed silicic acid (containing calcium oxide)
51% colloidal kaolin To produce a suitable preparation of the active compound, 1 part by weight of the active compound was intimately mixed with 9 parts by weight of the wettable powder base. The preparation of the active compound thus obtained was suspended in 90 parts of water.

The suspension of the active compound was sprayed, in an amount of 1 g of the active compound per square meter on to substrates consisting of different materials.

The sprayed coatings were tested, at specific intervals of time, for their biological activity.

For this purpose, the test insects were placed on the treated substrates. There was put over the test insects a squat cylinder which was closed at its upper end with a wire mesh in order to prevent the insects from escaping. After the animals had spent 8 hours on the substrate, the destruction of the test insects was determined as a percentage.

The active compounds, the nature of the test substrates, and the results, can be seen from the following Table 1:

EXAMPLE 2

Mosquito larvae test

Test animals: *Aedes aegypti*
Solvent: 99 parts by weight of acetone
Emulsifier: 1 part by weight of benzylhydroxydiphenyl polyglycol ether To produce a suitable preparation of active compound, 2 parts by weight of the active compound were dissolved in 1,000 parts by volume of the solvent containing the amount of emulsifier stated above. The solution thus obtained was diluted with water to the desired lower concentrations.

The aqueous preparations of the active compounds were placed in glass vessels and about 25 mosquito larvae were then placed in each glass vessel.

After 24 hours, the degree of destruction was determined as a percentage. 100% means that all the larvae Table 1

| Active compounds | Test substrates | Test insects | Residual test |||| Destruction of the test insects in % Age of the residual coatings in weeks ||||||||
|---|---|---|---|---|---|---|---|---|---|---|---|---|---|
| | | | 1 | 2 | 6 | 8 | 12 | 16 | 18 | 20 | 24 | 32 | 36 |
| known:<br />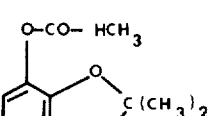<br />(A) | Plywood | *Musca domestica* | 100 | 100 | 100 | 100 | 100 | 8hrs. 40% | | | | | |
| | " | *Aedes Aegypti* | 100 | 100 | 100 | 100 | 100 | 100 | 100 | 100 | 8hrs. 80% | | |
| | Limed clay | *Aedes Aegypti* | 100 | 100 | 100 | 8hrs. 90% | | | | | | | |
| according to the invention:<br />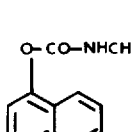<br />(2) | Plywood | *Musca domestica* | 100 | 100 | 100 | 100 | 100 | 100 | 100 | 100 | 100 | 100 | 8hrs=80% |
| | " | *Aedes Aegypti* | 100 | 100 | 100 | 100 | 100 | 100 | 100 | 100 | 100 | | 100 |
| | Limed clay | *Aedes Aegypti* | 100 | 100 | 100 | 100 | 100 | 100 | 8hrs. 70% | | | | | were killed. 0% means that no larvae at all were killed.

The active compounds, the concentrations of the active compounds and the results can be seen from the following Table 2:

Table 2

Mosquito larvae test

| Active compound | Active compound concentration of the solution in ppm | Degree of destruction in % |
|---|---|---|
| known:<br />(B) O-CO-HCH₃ structure with C(CH₃)₂ and CH₂ | 0.1 | 0 |
| (C) O-CO-NHCH₃ naphthyl | 5 | 80 |

Table 2-continued

| Active compound | Mosquito larvae test | Active compound concentration of the solution in ppm | Degree of destruction in % |
|---|---|---|---| according to the invention:

(1)

CF₃—C₆H₄—S(CH₃)—N(CH₃)—COO—[2,2-dimethyl-benzofuran]

0.1 — 100

(7)

CF₃—C₆H₄—S(CH₃)—N(CH₃)—COO—[naphthyl]

1 — 95

(5)

Cl, CF₃—C₆H₃—S(CH₃)—N(CH₃)—COO—[naphthyl]

1 — 80

EXAMPLE 3

Tetranychus test (resistant)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10–30 cm, were sprayed with the preparation of the active compound until dripping wet. These bean plants were then heavily infested with the two-spotted spider mite (*Tetranychus urticae*) in all stages of development.

After the specified periods of time, the effectiveness of the preparation of active compound was determined by counting the dead animals. The degree of destruction thus obtained was expressed as a percentage: 100% means that all the spider mites were killed whereas 0% means that none of the spider mites were killed.

The active compounds, the concentrations of the active compounds, the evaluation times and the results can be seen from the following Table 3:

Table 3

| Active compounds | (mites which damage plants) *Tetranychus* test (resistant) | Active compound concentration in % | Degree of destruction in % after 2 days |
|---|---|---|---| known:

(A) 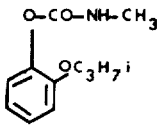

0.1 — 0

Table 3-continued

| Active compounds | (mites which damage plants) Tetranychus test (resistant) | |
|---|---|---|
| | Active compound concentration in % | Degree of destruction in % after 2 days |
| 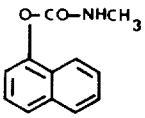 (C) | 0.1 | 0 |
| 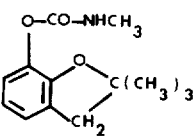 (B) | 0.1 | 0 |
| according to the invention: | | |
| 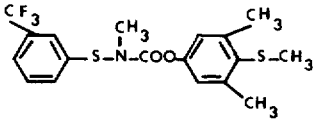 (3) | 0.1<br>0.01<br>0.001 | 100<br>95<br>40 |
| 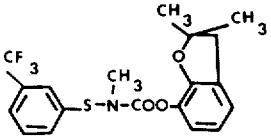 (1) | 0.1 | 95 |

EXAMPLE 4

Plutella test

Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100% means that all the caterpillars were killed whereas 0% means that none of the caterpillars were killed.

The active compounds, the concentrations of the active compounds, the evaluation times and the results can be seen from the following Table 4:

Table 4

| Active compounds | (Insects which damage plants) Plutella test | |
|---|---|---|
| | Active compound concentration in % | Degree of destruction in % after 3 days |
| known: | | |
| 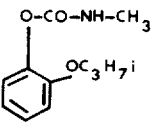 (A) | 0.1<br>0.01<br>0.001 | 100<br>80<br>0 |

Table 4-continued (Insects which damage plants)
*Plutella* test

| Active compounds | Active compound concentration in % | Degree of destruction in % after 3 days |
|---|---|---|
| according to the invention: 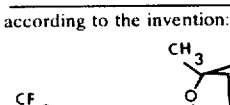 (1) | 0.1<br>0.01<br>0.001<br>0.0001 | 100<br>100<br>85<br>30 |

EXAMPLE 5

Phaedon larvae test

Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dripping wet and were then infested with mustard beetle larvae (*Phaedon cochleariae*).

After the specified periods of time, the degree of destruction was determined as a percentage: 100% means that all the beetle larvae were killed whereas 0% means that none of the beetle larvae were killed.

The active compounds, the concentrations of the active compounds, the evaluation times and the results can be seen from the following Table 5:

Table 5

(Insects which damage plants)
*Phaedon* larvae test

| Active compounds | Active compound concentration in % | Degree of destruction in % after 3 days |
|---|---|---|
| known: (A) [structure with O-CO-NH-CH$_3$ and OC$_3$H$_7$i] | 0.1<br>0.01 | 100<br>0 |
| according to the invention: (3) [structure with CF$_3$, CH$_3$, S-N-COO, S-CH$_3$, CH$_3$, CH$_3$] | 0.1<br>0.01<br>0.001 | 100<br>100<br>100 |
| (5) [structure with CF$_3$, Cl, CH$_3$, S-N-COO, naphthyl] | 0.1<br>0.01 | 100<br>100 |
| [structure with CF$_3$, CH$_3$, S-N-COO, CH$_3$, CH$_3$, O] | 0.1<br>0.01<br>0.001 | 100<br>100<br>75 |

Table 5-continued (Insects which damage plants)
Phaedon larvae test

| Active compounds | Active compound concentration in % | Degree of destruction in % after 3 days |
|---|---|---|
| (1) 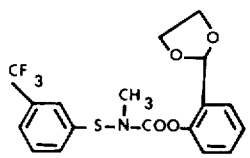 (4) | 0.1<br>0.01<br>0.001 | 100<br>95<br>90 |

EXAMPLE 6

Critical concentration test

Test nematode: Meloidogyne incognita
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27°C. After 4 weeks, the lettuce roots are examined for infestation with nematodes, and the degree of effectiveness of the active compound is determined as a percentage. The degree of effectiveness is 100% when infestation is completely avoided; it is 0% when the infestation is exactly the same as in the case of the control plants in untreated soil which has been infested in the same manner.

The active compounds, the amounts applied and the results can be seen from Table 6.

Table 6

| Active compound (constitution) | Nematocides: Meloidogyne incognita | | | | |
|---|---|---|---|---|---|
| | Concentration of active compound in ppm | | | Degree of destruction in % | |
| | 20 | 10 | 5 | 2,5 | 1,25 |
| 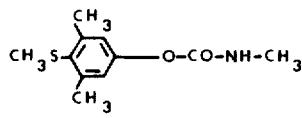<br>(D) (known) | | | 0 | | |
| 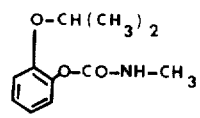<br>(A) (known) | | 50 | 0 | | |
| 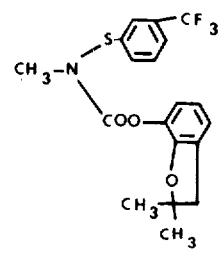<br>(1) | 100 | 100 | 96 | 90 | 30 |

EXAMPLE 7

Critical concentration test /soil insects

Test insect: cabbage root fly maggots (*Phorbia brassicae*)

Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount by weight of active compound per unit volume of soil, which is given in p.p.m., e.g. mg/l, is decisive. The soil is filled into pots and the pots are left to stand at room temperature. After 24 hours, the test insects are put into the treated soil, and after a further 48 hours, the degree of effectiveness of the active compound is determined as a percentage by counting the dead and living test insects. The degree of effectiveness is 100% when all the test insects have been killed; it is 0% when exactly as many test insects are alive as in the case of the control.

The active compounds, the amounts applied and the results can be seen from Table 7.

56 g of 3-trifluoromethylphenylsulfenyl chloride and 20.4 g of N-methylcarbamic acid fluoride were initially introduced into 250 ml of toluene and 37 ml of triethylamine were added dropwise at 20° - 30°C. Thereafter, the amine hydrochloride which had precipitated was filtered off and the filtrate was concentrated. Vacuum distillation was employed. Yield = 46 g (70%). Boiling point = 94°–96°C/0.15mmHg. $n_D^{20}$ = 1.4896.

The following compound was obtained by an analogous method:

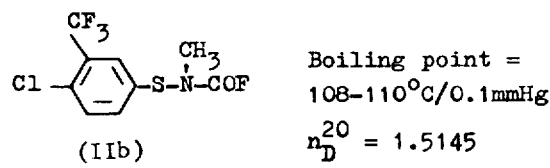

Boiling point = 108–110°C/0.1mmHg
$n_D^{20}$ = 1.5145 b) 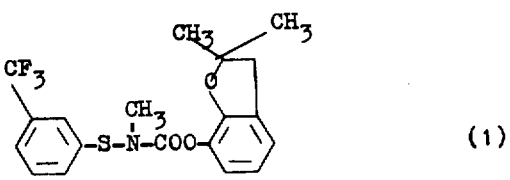 (1)

Table 7

| Active compound (constitution) | Soil insecticides: Phorbia brassicae maggots in the soil | | | | |
|---|---|---|---|---|---|
| | Concentration of active compound in ppm | | | Degree of destruction in % | |
| | 20 | 10 | 5 | 2,5 | 1,25 |
| (D) CH₃S—⟨⟩—O-CO-NH-CH₃ (with CH₃ groups) (known) | 0 | | | | |
| (1) CH₃-N(S-Ar-CF₃)(COO-Ar-O-C(CH₃)₂) | 100 | 100 | 95 | 75 | 0 |

The process of this invention is illustrated by the following preparative Example.

EXAMPLE 8 a. The starting materials required for the production of the compounds according to the invention can be produced, for example, as follows:

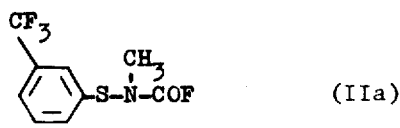 (IIa)

12.7 g of N-methyl-N-(3-trifluoromethylphenylmercapto)-carbamic acid fluoride and 8.2 g of 7-hydroxy-2,2-dimethyl-2,3-dihydrobenzofurane were dissolved in 200 ml of benzene. 6 g of triethylamine were added dropwise at room temperature while stirring. In the course thereof, the temperature rose slightly. After 2 hours, the amine hydrochloride which had precipitated was filtered off and the filtrate was repeatedly washed with water. After drying with Na₂SO₄, the solvent was distilled off. A yellow oil remained. Yield: 15 g (75%); $n_D^{20}$ = 1.5349.

The following compounds were obtained by methods analogous to that described above:

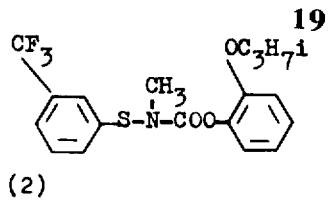

(2)

Boiling point = 155-158°C/0.08mmHg
$n_D^{20} = 1.5301$

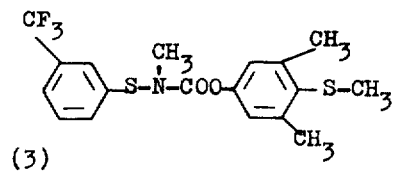

(3)

Boiling point = 205-210°C/0.6mmHg
$n_D^{20} = 1.5629$

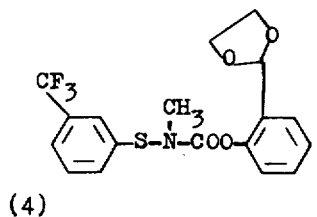

(4)

Boiling point = 198-200°C/0.4mmHg
$n_D^{20} = 1.5439$

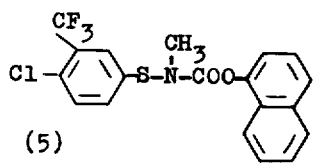

(5)

Melting point = 104°C

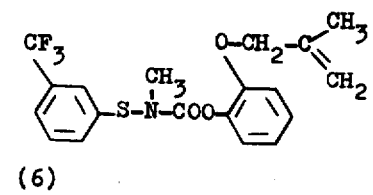

(6)

Boiling point = 160-165°C/0.18mmHg
$n_D^{20} = 1.5376$

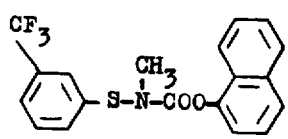

(7)

$n_D^{20} = 1.5733$

It will be appreciated that the instant specification and examples are set forth by way of illustration and not limitation, and that various modifications and changes may be made without departing from the spirit and scope of the present invention.

What is claimed is:

1. An N-sulfenylated N-methylcarbamic acid aryl ester of the formula

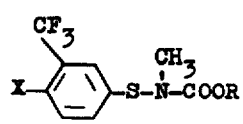
(I)

in which

X is hydrogen or halogen, and

R is dihydrobenzofuranyl optionally substituted by methyl.

2. A compound according to claim 1, in which
X is hydrogen and
R is 2,2-dimethyl-2,3-dihydrobenzofuranyl.

3. The compound according to claim 1 wherein such compound is N-methyl-N-(3-trifluoromethylphenylmercapto)-carbamic acid 7-(2,2-dimethyl-2,3-dihydrobenzofuranyl) ester of the formula

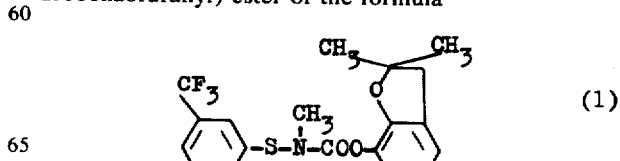
(1)

* * * * *